United States Patent [19]
Dukatz et al.

[11] Patent Number: 5,704,684
[45] Date of Patent: Jan. 6, 1998

[54] INTEGRATED CHILD SEAT WITH CHILD SEAT BELT RETRACTOR ASSEMBLY

[75] Inventors: Matthew E. Dukatz, Bloomfield Hills; Fred C. Kresky, Rochester Hills; Jeffrey T. Lambert, Commerce Township; Jay P. McCarthy, Livonia; Stephen A. Sharples, Northville, all of Mich.

[73] Assignees: Atoma International Inc., Newmarket, Canada; Chrysler Corporation, Auburn Hills, Mich.

[21] Appl. No.: 387,427

[22] Filed: Feb. 10, 1995

[51] Int. Cl.⁶ .................................................... B60N 2/30
[52] U.S. Cl. ............................................ 297/238; 297/484
[58] Field of Search ........................... 297/238, 256.15, 297/467, 484; 280/807, 808

[56] References Cited

U.S. PATENT DOCUMENTS

| 2,899,146 | 8/1959 | Barecki | 297/216.1 X |
|---|---|---|---|
| 4,886,315 | 12/1989 | Johnson | 297/484 X |
| 5,224,756 | 7/1993 | Dukatz et al. | |
| 5,280,995 | 1/1994 | Elton | 297/484 X |
| 5,398,997 | 3/1995 | McFalls | 297/484 X |
| 5,503,461 | 4/1996 | Schreier | 297/484 |

FOREIGN PATENT DOCUMENTS

| 1440281 | 4/1966 | France | 297/484 |
|---|---|---|---|
| 2108718 | 8/1972 | Germany | 297/484 |
| 406135271 | 5/1994 | Japan | 297/238 |
| 406135272 | 5/1994 | Japan | 297/238 |

*Primary Examiner*—Peter R. Brown
*Attorney, Agent, or Firm*—Cushman Darby & Cushman Intellectual Property Group of Pillsbury Madison & Sutro LLP

[57] ABSTRACT

A seat assembly including an integrated child seat assembly for a motor vehicle comprises a seat frame including a seat cushion frame and a seat back frame. A cushion assembly is mounted on the seat frame assembly and includes a movable cushion construction mounted for movement between (1) an adult position wherein the cushion assembly including the movable cushion construction provides an adult seat cushion and a cushioned adult seat back for engaging the back of an adult sitting on the adult seat cushion, and (2) a child position wherein the cushion assembly including the movable cushion construction provides a child's seat and a cushioned child's seat back. An adult seat belt assembly is mounted with respect to the seat assembly, and a child's seat belt assembly is provided with the integrated child's seat assembly. The child's seat belt assembly includes a pair of belts each extending from respective take-up reels connected with an upper portion of the seat back frame forwardly of the cushioned child's seat back. The belts each have upper portions thereof wound on the respective take-up reels in such a fashion that the belts pay-out generally from bottom portions of the reels when the belts are extended forwardly of the cushioned child's seat back. The child's seat belt assembly also includes a single controlling mechanism operatively connected with each of the take-up reels constructed and arranged to control the pay-out and take-up of the belts.

3 Claims, 7 Drawing Sheets

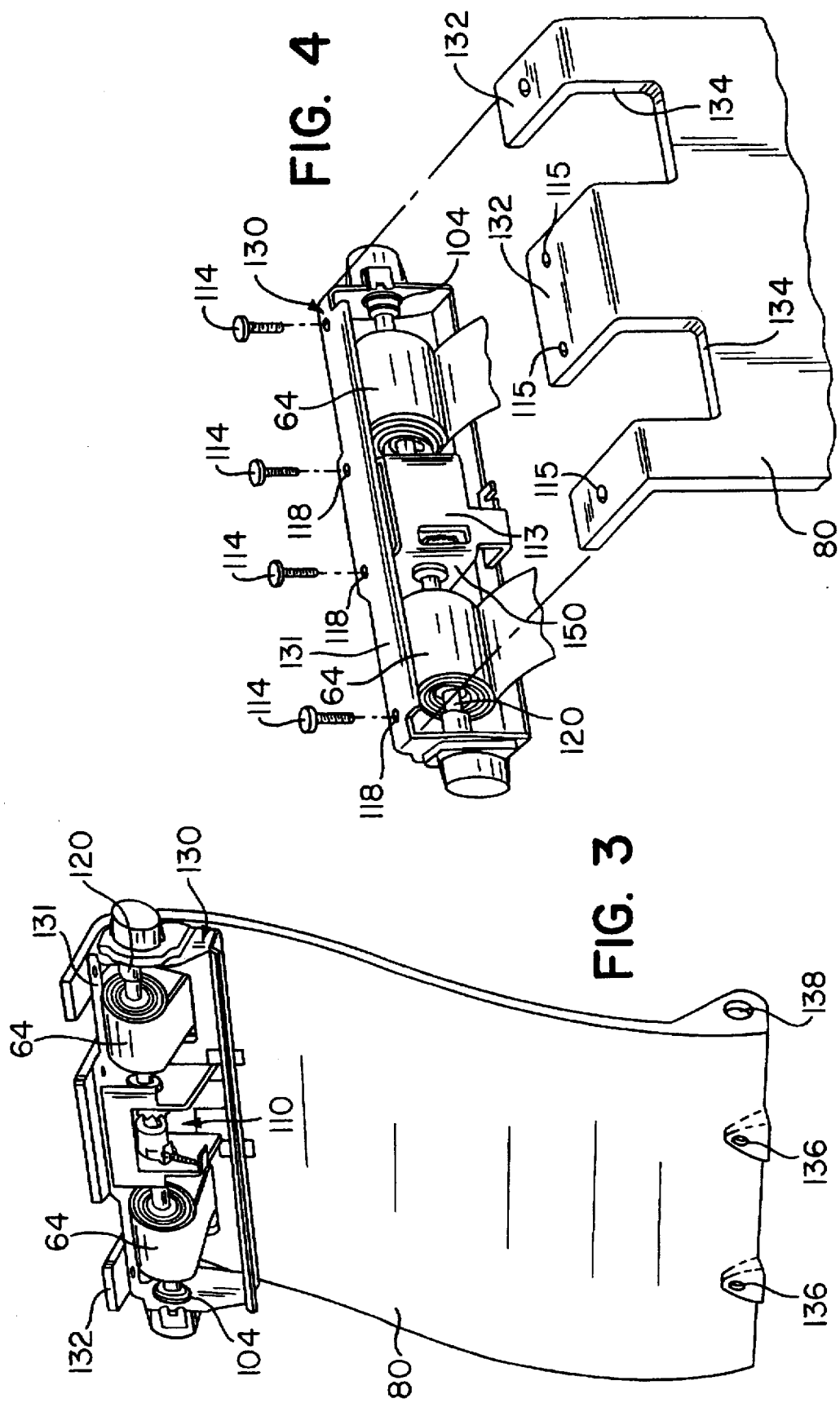

INTEGRATED CHILD SEAT WITH CHILD SEAT BELT RETRACTOR ASSEMBLY

BACKGROUND OF THE INVENTION

This invention relates to vehicle seats and more particularly to integrated seats for motor vehicles capable of being moved between an adult position and a child position.

Integrated seats which contemplate both a child and an adult position are to be contrasted with the practice in which the seats provided are adult seats, and separate child seat units are used to accommodate children. The usual situation is that the separate units each contain their own seat belt assemblies or occupant restraints and the separate child's unit is affixed to the existing adult seat by strapping the separate child unit to the adult seat by the adult seat belt assembly.

Integrated seats are typically provided with a movable cushion construction, which is movable between an adult position and a child position. In the adult position, the movable cushion construction is typically folded in such fashion that the integrated seat as a whole provides an adult seat and an adult seat back. In most arrangements, when in the adult position, the movable cushion construction forms part of the adult seat back, although in other arrangements the movable cushion construction forms part of the adult seat. In the child position, the movable cushion construction is unfolded and arranged to provide a cushioned child's seat in overlying relation with respect to the adult seat.

Integrated seats are also typically provided with both an adult seat belt assembly and a child seat belt assembly. When the integrated seat is in the adult position, the child seat belt assembly is typically folded into the adult seat back, together with the movable cushion construction. An advancement in integrated seats is disclosed in U.S. Pat. No. 5,224,756 ("the U.S. Pat. No. '756"), which is hereby incorporated by reference.

Heretofore, integrated seats have primarily been provided with two different types of child seat belt assembly tensioning arrangements. The first type utilizes a tensioning adjuster in which a portion of the belt is grippingly retained between a cross member and a serrated surface, as disclosed in the aforementioned U.S. Pat. No. '756. The second type incorporates a retractor assembly having a biased take-up reel, which is normally biased to take-up belt material until a desired tension in the belt is attained. Each of the aforementioned arrangements has its particular benefits and applications.

Heretofore, the biased take-up reels provided with child seat belt assemblies have been mounted on the lower portions of the seat frame assembly or on lower portions of the child's seat module. For example, in U.S. Pat. No. 5,280,995 to Elton ("the U.S. Pat. No. '995 "), there is disclosed a vehicle seat assembly having an integrated child seat with a dual retractor assembly mounted on a bracket disposed at the bottom of the child's seat back panel, adjacent the vehicle floor pan.

Providing the retractor assemblies or take-up reels in such location requires the two shoulder belts of the child seat belt assembly to extend upwardly from the reels and over a fixed support bar before they extend forwardly of the child's seat back and downwardly over the child seat occupant's shoulders. This can be appreciated from the aforementioned U.S. Pat. No. '995. It can also be appreciated that movement of the belts over the support bar may cause undesirable wearing of the belts. In addition, friction between the belts and the support bar makes it somewhat more difficult to manually pull the belts against the bias of the take-up reels to cause the reels to pay-out to an extent sufficient to harness a child seat occupant with the child seat belt assembly. It is desirable to provide take-up reels in such fashion that enables the belts to pay-out with sufficient ease and convenience when an individual is attempting to establish sufficient slack in the belts to harness and/or unharness a child seat occupant. Moreover, because the belts are looped over the support, unless they are afforded with some additional accommodation, such as vertically spaced slots in the child's seat back for receiving and guiding the belts as they extend forwardly of the child's seat back, the belts will extend forwardly and downwardly from the child's seat back from the same position (i.e., from over the fixed support bar), irrespective of the size of the child or the height of his or her shoulders.

It is an object of the present invention to overcome the problems noted above. To accomplish this object, the present invention provides a seat assembly including an integrated child seat assembly for a motor vehicle. The seat assembly includes a seat frame assembly for securement within the motor vehicle including a seat cushion frame and a seat back frame mounted with respect to the seat cushion frame in an operative fixed relation. A cushion assembly is mounted on the seat frame assembly and includes a movable cushion construction mounted for movement between (1) an adult position wherein the cushion assembly including the movable cushion construction provides an adult seat cushion disposed in an operative position with respect to the seat frame assembly and a cushioned adult seat back for engaging the back of an adult sitting on the adult seat cushion, and (2) a child position wherein the cushion assembly including the movable cushion construction provides a child's seat disposed in a position above the operative position of the adult seat cushion for engaging a child sitting thereon, and a cushioned child's seat back extending upwardly from the cushioned child's seat for engaging the back of a child sitting on the cushioned child's seat. In addition, an adult seat belt assembly is mounted with respect to the seat assembly constructed and arranged to be disposed in restraining relation with respect to an adult sitting on the adult seat cushion with the movable construction in the adult position. A child's seat belt assembly is connected with the seat frame assembly constructed and arranged to be disposed in restraining relation with respect to a child sitting on the cushioned child's seat with the movable construction in the child position. The cushioned child's seat provides an anchor point constructed and arranged to enable the child's seat belt assembly to be releasably locked between the legs of a child sitting on the cushioned child's seat so as to maintain the child's seat belt assembly in restraining relation with respect to a child sitting on the cushioned child's seat with the movable construction in the child position. The child's seat belt assembly includes a pair of belts, a connector structure, and a controlling mechanism. The pair of belts each extend from respective take-up reels connected with an upper portion of the seat back frame forwardly of the cushioned child's seat back for extension over the shoulders of a child sitting on the cushioned child's seat with the movable cushion assembly in the child position. The connector structure is associated with the belts and is constructed and arranged to be releasably connected at the anchor point to enable the child's seat belt assembly to be releasably locked at the anchor point between the legs of a child sitting on the cushioned child's seat. The belts each have upper portions thereof wound on the respective take-up reels in such a fashion that the belts pay-out generally from bottom portions of the reels when the belts are extended forwardly of the cushioned child's seat back over the shoulders of a child sitting on the cushioned child's seat and the connector structure is releasably connected at the anchor point so that the child's seat belt assembly is releasably locked at the anchor point between the legs of a child sitting on the cushioned child's seat. The belt assembly is manually releasable from between the legs of a child sitting on the cushioned child's seat by a single hand of an individual releasing the connector structure from the anchor point so as to enable the individual to lift the belts off the shoulders of a child sitting on the cushioned child's seat with the same hand by moving the connector structure with the same hand over the head of the child. The belts pay-out generally from portions of the reels generally higher than the bottom portions when an individual lifts the belts off the shoulders of a child sitting on the cushioned child's seat by lifting the connector structure over the head of the child. The controlling mechanism is operatively connected with the take-up reels and is constructed and arranged to control the pay-out and take-up of the belts by the respective reels.

It can be appreciated that the availability of space for accommodating take-up reels at the upper portion of the seat back frame is limited. It can also be appreciated that there always exists a need to reduce the number of parts associated with a belt assembly in order to reduce costs and make the assembly lighter in weight. It is therefore another object of the present invention to satisfy the need expressed above with an innovative arrangement which is simple in construction, compact and relatively inexpensive. To accomplish this object, the present invention provides a seat assembly including an integrated child seat assembly for a motor vehicle. The seat assembly includes a seat frame assembly for securement within the motor vehicle including a seat cushion frame and a seat back frame mounted with respect to the seat cushion frame in an operative fixed relation. A cushion assembly is mounted on the seat frame assembly and includes a movable cushion construction mounted for movement between (1) an adult position wherein the cushion assembly including the movable cushion construction provides an adult seat cushion disposed in an operative position with respect to the seat frame assembly and a cushioned adult seat back for engaging the back of an adult sitting on the adult seat cushion, and (2) a child position wherein the cushion assembly including the movable cushion construction provides a child's seat disposed in a position above the operative position of the adult seat cushion for engaging a child sitting thereon, and a cushioned child's seat back extending upwardly from the cushioned child's seat for engaging the back of a child sitting on the cushioned child's seat. An adult seat belt assembly is mounted with respect to the seat assembly and is constructed and arranged to be disposed in restraining relation with respect to an adult sitting on the adult seat cushion with the movable construction in the adult position. A child's seat belt assembly is connected with the seat frame assembly and is constructed and arranged to be disposed in restraining relation with respect to a child sitting on the cushioned child's seat with the movable construction in the child position. The cushioned child's seat provides an anchor point for the child's seat belt assembly between the legs of a child sitting on the cushioned child's seat. The child's seat belt assembly includes a pair of belts each extending from respective take-up reels connected with an upper portion of the seat back frame forwardly of the cushioned child's seat back for extension over the shoulders of a child sitting on the cushioned child's seat with the movable cushion assembly in the child position. The belts each have upper portions thereof wound on the respective take-up reels in such a fashion that the belts pay-out generally from bottom portions of the reels when the belts are extended forwardly of the cushioned child's seat back. The child's seat belt assembly also includes a single controlling mechanism operatively connected with each of the take-up reels constructed and arranged to control the pay-out and take-up of the belts by the respective reels in such a fashion that each belt is taken-up and paid-out simultaneously with and to the same extent as the other such that substantially the same length of each of the belts will extend from the respective reels at all times.

It is a further object of the invention to provide the advantages noted above in a child's seat module which is adapted to be mounted on a seat back frame of a vehicle seat having a seat cushion and spaced apart side cushions on the seat back frame defining a child-receiving space therebetween. The child seat module comprises a rigid back panel of a size to fit within the space between the side cushions constructed and arranged to engage the seat back frame forwardly thereof within a rearward portion of the space between the side cushions for fixed securement thereto. A cushion assembly is mounted on the back panel and includes upper and lower movable cushion constructions mounted for movement between (1) an adult position wherein the movable cushion constructions are disposed within the space between the side cushions and provide a cushioned adult seat back for engaging the back of an adult sitting on the seat cushion, and (2) a child position wherein the movable cushion constructions extend from the space between the side cushions and the cushion assembly provides a cushioned child's seat including the lower movable cushion assembly extending from the bottom of the space in overlying relation to the seat cushion, a cushioned child's seat back extending upwardly from the cushioned child's seat within the space between the side cushions, and a cushioned child's head support including the upper movable cushion assembly above the cushioned child's seat back. A child's seat belt assembly is connected with the back panel and is constructed and arranged to be disposed in restraining relation with respect to a child sitting on the cushioned child's seat with the movable cushion constructions in the child position. The lower movable cushion construction provides an anchor point for the child's seat belt assembly between the legs of a child sitting on the cushioned child's seat. The child's seat belt assembly includes a pair of belts and a single controlling mechanism. The pair of belts each extend from respective take-up reels connected with an upper portion of the back panel forwardly of the cushioned child's seat back for extension over the shoulders of a child sitting on the cushioned child's seat with the movable cushion assembly in the child position. The belts each have upper portions thereof wound on the respective take-up reels in such a fashion that the belts pay-out generally from bottom portions of the reels when the belts are extended forwardly of the cushioned child's seat back. The single controlling mechanism is operatively connected with each of the take-up reels and is constructed and arranged to control the pay-out and take-up of the belts by the respective reels in such a fashion that each belt is taken-up and paid-out simultaneously with and to the same extent as the other such that substantially the same length of each of the belts will extend from the respective reels at all times.

Where integrated child seat assemblies provide spring biased take-up reels which pay-out a pair of shoulder belts for extension over the shoulders of a child's seat occupant and for connection with an anchor point between the legs of the child's seat occupant, the mere presence and position of the belts often interferes with the ingress and/or egress of the child to and from the child's seat. In many arrangements it is necessary for an adult to utilize one hand to maintain the belts in a position that will not interfere with the aforesaid ingress and/or egress, while utilizing the other hand to help the child into or out of the child seat. This is somewhat of an awkward and cumbersome procedure. It is therefore an object of the present invention to provide a vehicle seat assembly which overcomes the problems noted above. In accomplishing this object, the present invention provides a seat assembly including an integrated child seat assembly for a motor vehicle. The seat assembly comprises a seat frame assembly for securement within the motor vehicle including a seat cushion frame and a seat back frame mounted with respect to the seat cushion frame in an operative fixed relation. A cushion assembly is mounted on the seat frame assembly and includes a movable cushion construction mounted for movement between (1) an adult position wherein the cushion assembly including the movable cushion construction provides an adult seat cushion disposed in an operative position with respect to the seat frame assembly and a cushioned adult seat back for engaging the back of an adult sitting on the adult seat cushion, and (2) a child position wherein the cushion assembly including the movable cushion construction provides a child's seat disposed in a position above the operative position of the adult seat cushion for engaging a child sitting thereon, and a cushioned child's seat back extending upwardly from the cushioned child's seat for engaging the back of a child sitting on the cushioned child's seat. The cushion assembly further includes a cushioned headrest mounted with respect to the seat frame assembly for engaging (1) the back of the head of an adult sitting on the adult seat cushion when the movable cushion construction is in the adult position, and (2) the back of the head of a large child sitting on the movable cushion construction when the movable cushion construction is in the child position. An adult seat belt assembly is mounted with respect to the seat assembly constructed and arranged to be disposed in restraining relation with respect to an adult sitting on the adult seat cushion with the movable construction in the adult position. A child's seat belt assembly is connected with the seat frame assembly constructed and arranged to be disposed in restraining relation with respect to a child sitting on the cushioned child's seat with the movable construction in the child position. The cushioned child's seat provides an anchor point constructed and arranged to enable the child's seat belt assembly to be releasably locked between the legs of a child sitting on the cushioned child's seat so as to maintain the child's seat belt assembly in restraining relation with respect to a child sitting on the cushioned child's seat with the movable construction in the child position. The child's seat belt assembly includes a pair of belts each extending from respective take-up reels forwardly of the cushioned child's seat back for extension over the shoulders of a child sitting on the cushioned child's seat with the movable cushion assembly in the child position. A connector structure is associated with the belts and constructed and arranged to be releasably connected at the anchor point to enable the child's seat belt assembly to be releasably locked at the anchor point between the legs of a child sitting on the cushioned child's seat. A spring assembly is operatively connected with the take-up reels and constructed and disposed to bias the take-up reels with a predetermined biasing force to take-up the belts and provide slight tensioning of the belts over the shoulders of a child when the connector structure is releasably locked at the anchor point between the legs of a child sitting on the cushioned child's seat. The belt assembly is manually releasable from between the legs of a child sitting on the cushioned child's seat by a single hand of an individual releasing the connector structure from the anchor point so as to enable the individual to lift the belts off the shoulders of a child sitting on the cushioned child's seat with the same hand by moving the connector structure with the same hand over the head of the child, the connector structure being further movable to effectuate movement of the belts against the bias of the take-up reels to effectuate pay-out of the belts from the reels so as to create sufficient slack in the belts to enable the connector structure to be positioned behind the headrest. Positioning of the connector structure behind the headrest provides sufficient resistance against the predetermined biasing force of the spring assembly to prevent the take-up reels from taking up the belts to any significant extent that would cause the connector structure to return forwardly over the headrest without manual assistance.

Integrated child seats have been known to be provided in bench-type seats, typically having a low back, such as those provided in a van and which accommodate two or more individuals sitting in side-by-side relation. Because support for the back of the head of a child in a vehicle is desirable, integrated child seat assemblies provided in bench-type seats have been equipped with head rests that are deployed to engage the head of a large and/or small child when the integrated child seat is deployed. It can be appreciated that the back of the head of a small child (e.g., in the range of approximately 20 pounds) may simply engage the cushioned child's seat back, which provides adequate support. In these arrangements, however, the bench-type seats have not been provided with an adult head rest, which extends above the adult seat back for engagement with the back of the head of an adult seat occupant. The omission of an adult head rest in a bench-type seat having an integrated child seat is due, in part, to the limited space for providing such a head rest, especially in light of the space required to accommodate a head rest cooperable with the integrated child seat for supporting the back of the head of a large child. There is therefore a need to provide a bench-type seat, which includes an integrated child seat, and which provides a head rest that can be used by both an adult sitting on the bench seat when the integrated child seat is not deployed, and also by a large child occupying the deployed integrated child seat. To satisfy this need, the present invention provides a bench seat assembly including a pair of integrated child seat assemblies for a motor vehicle comprising a seat frame assembly for securement within the motor vehicle including a seat cushion frame and a seat back frame mounted with respect to the seat cushion frame in an operative fixed relation. A cushion assembly accommodates at least two seat occupants sitting in side-by-side relation thereon. The cushion assembly includes a pair of side-by-side movable cushion constructions mounted on the seat frame assembly, each of the movable cushion constructions being mounted for movement between (1) an adult position wherein the cushion assembly including the movable cushion construction provides an adult seat cushion disposed in an operative position with respect to the seat frame assembly and a cushioned adult seat back for engaging the back of an adult sitting on the adult seat cushion, and (2) a child position wherein the cushion assembly including the movable cushion construction provides a cushioned child's seat disposed in a position above the operative position of the adult seat cushion for engaging a child sitting thereon, and a cushioned child's seat back extending upwardly from the cushioned child's seat for engaging the back of a child sitting on the cushioned child's seat. The cushion assembly further includes a pair of cushioned headrests mounted on the seat frame assembly for extension above the cushioned adult seat back, each of the headrests being positioned in operative relation with respect to an associated one of the movable cushion constructions. Each headrest and associated movable cushion construction are constructed and arranged such that (1) the headrest engages the back of the head of an adult sitting on the adult seat cushion when the associated movable cushion construction is in the adult position, (2) the headrest engages the back of the head of a large child sitting on the associated movable cushion construction when the associated movable cushion construction is in the child position, and (3) the cushioned child's seat back engages the back of the head of a small child sitting on the associated movable cushion construction when the associated movable cushion construction is in the child position. A pair of child's seat belt assemblies are connected with the seat frame assembly and are associated with one of the movable cushion constructions. Each child's seat belt assembly is constructed and arranged to be releasably locked in restraining relation with respect to a child sitting on the associated cushioned child's seat provided by the associated movable construction in the child position. Each child's seat belt assembly includes a pair of belts each extending forwardly of the associated cushioned child's seat back for extension over the shoulders of a child sitting on the associated cushioned child's seat with the associated movable cushion assembly in the child position, and is anchored at an anchor point between the legs of the child sitting on the associated movable cushion assembly in the child position.

These and other objects of the present invention will become more apparent during the course of the following detailed description and appended claims.

BRIEF DESCRIPTION OF THE DRAWINGS

FIG. 3 is a schematic perspective view showing an integrated child's seat back panel and a portion of the child's seat belt assembly in accordance with the principles of the present invention;

FIG. 4 is a schematic perspective view showing the connection of the controlling mechanism and take-up reels of the child's seat belt assembly with the back panel in accordance with the principles of the present invention;

DETAILED DESCRIPTION OF THE DRAWINGS

Figure 1:
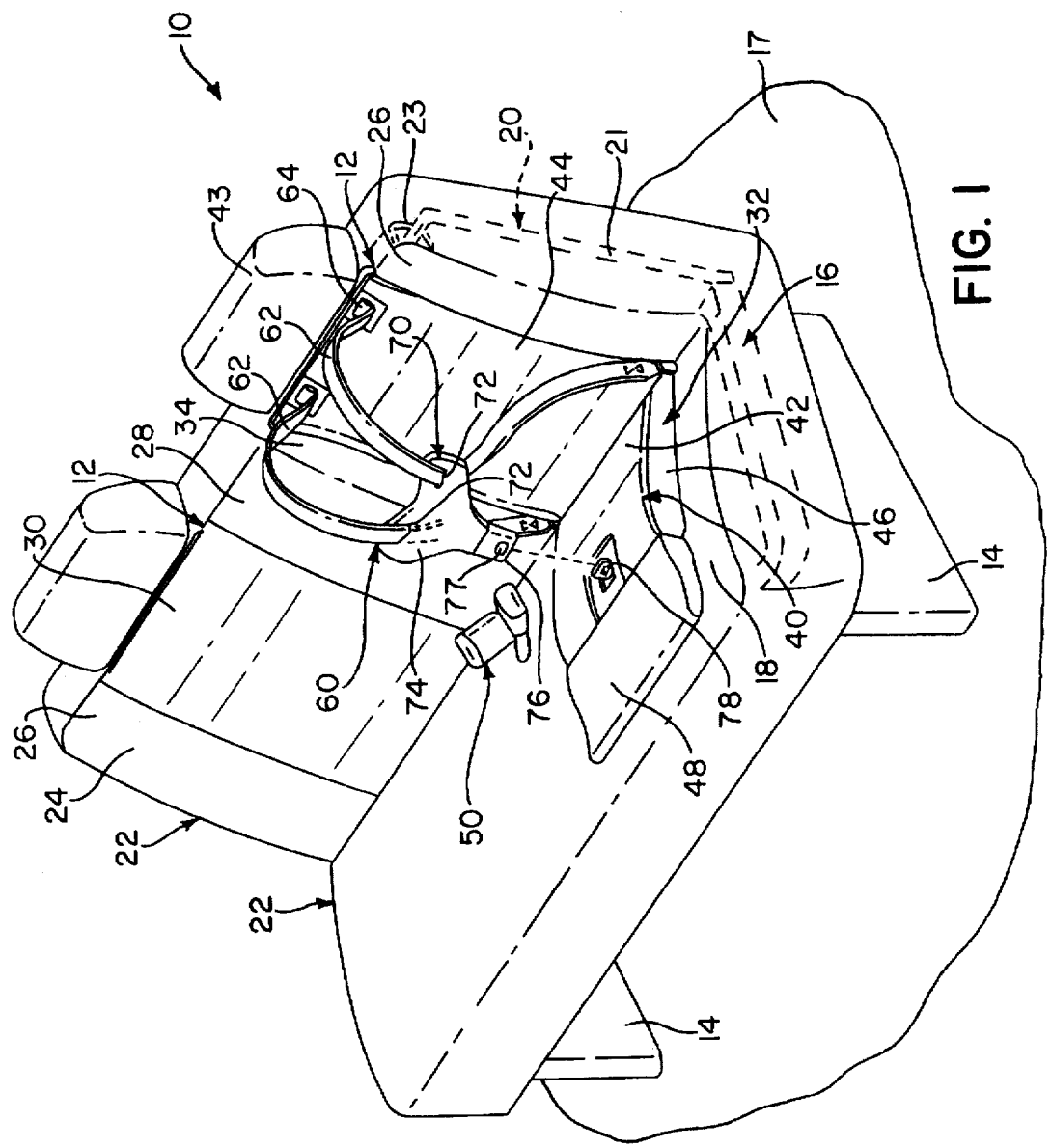
FIG. 1 is a perspective view showing the seat assembly in accordance with the principles of the present invention, with the right side of the figure showing the seat assembly in the child position and the left side of the figure showing the seat assembly in the adult position.

In FIG. 1, there is shown a seat assembly 10, which is in the form of a bench seat, and includes a pair of integrated child seat assemblies, each preferably in the form of a module 12, suitable to be installed into the seat assembly as a unit. The seat assembly 10 is shown in the child position in the right-hand side of FIG. 1., and in the adult position in the left-hand side of FIG. 1.

The seat assembly 10 includes a pair of spaced risers 14 for mounting the seat assembly 10 on the floor 17 of a motor vehicle. The seat assembly 10 incorporates a seat frame assembly, including a seat cushion frame assembly 16, and seat back frame assembly 20, which are shown in dashed lines in FIG. 1. The seat cushion frame assembly 16 has a tubular rectangular peripheral frame structure, and carries a covered seat cushion 18 of conventional construction. As shown, the width of the seat cushion 18 is sufficient to enable two adult seat occupants to sit thereon in side-by-side operative positions. It is understood, however, that many of the principles of the present invention also apply to a single Seat assembly adapted to accommodate only one person, and also to seat assemblies that can accommodate more than two people.

The seat back frame assembly 20 includes a main inverted U-shaped tubular frame member 21 positioned so that the lower free ends of the leg portions thereof are rigidly fixed to the rearward sides of the main seat frame assembly 16 and so that the central bight portion extends along the upper extent of the seat back. An upper rail portion 23 extends along the central bight portion and is rigidly secured with respect thereto, preferably by welding or by being bolted, and facilitates securement of the child's seat module and seat belt assembly of the present invention to the seat back frame as will be more fully described in conjunction with FIG. 2. Typically, a lower tubular horizontal frame member (not shown in FIG. 1) may also form part of the seat back frame assembly 20 and would be welded or otherwise fixed between the lower leg portions of the main U-shaped frame member 21 shown. Furthermore, the rail member 23 may be provided throughout the extent of the main U-shaped frame member to provide added rigidity of the frame assembly 21, if desired.

A cushion assembly, generally indicated at 22, includes the aforementioned adult seat cushion 18 mounted on seat frame assembly 16, and a cushioned adult seat back 24. The adult seat back 24 includes the seat back frame assembly 20 on which is mounted the outer and central side cushions 26, 28 and cushioning 30 disposed therebetween provided by a movable cushion construction, generally indicated at 32. The movable cushion construction 32 is movable between an adult position and a child position. In the adult position, the movable cushion construction 32 is disposed within a space 34 between the side cushions 26 and 28 and provides the cushioning 30 vertically for engagement by the center of the back of an adult seat occupant sitting on the seat cushion 18, as shown in the left hand operative position in FIG. 1. In the child's position, the movable cushion construction 32 extends from the bottom of the space 34 in overlying supported relation to the seat cushion 18 so as to provide a cushioned child's seat, as shown in the right-hand operative position in FIG. 1. The cushioned child's seat includes a removable cushioned pad 40, having a seat portion 42 and a back portion 44.

A pair of manually movable headrests 43 are mounted on and extend upwardly from the cushioned adult seat back 24. In the Figures, only the upper cushioned portion of the headrests 43 are shown. It can be appreciated, however, that the upper cushioned portions of the headrests are rigidly mounted on the central bight portion of an inverted U-shaped metallic member. The downwardly extending legs of the U-shaped member have a circular cross section and are received in slots provided in upper portions of the cushioned adult seat back 24. The legs have vertically spaced grooves or notches that cooperatively receive spring biased detentes associated with the slots in the upper portions of the adult seat back 24. The detentes ride along the legs of the U-shaped member as the height of headrest is manually adjusted and are received within the notches to enable the headrests to be selectively maintained at desired vertical positions above the cushioned adult seat back 24. It is preferred for the lower ends of the legs to be slightly flared or otherwise accommodated to prevent the headrest 43 from being completely removed from the cushioned adult seat back 24.

Each of the headrests 43 are positioned in operative relation with respect to an associated one of the movable cushion constructions 32. With the movable cushion construction 32 in the adult position, the associated headrest 43 can engage the back of the head of an adult sitting on the seat assembly 22. The vertical position of the headrests 43 can be manually adjusted to accommodate the particular size of the adult. When the movable cushion construction 32 in the child position, the associated headrest 43 is arranged to engaged the back of the head of a large child (e.g., approximately 60 pounds) sitting on movable cushion construction 32. In this instance, the headrest 43 is optimally disposed in its lowermost position. When a small child (e.g., approximately 20 pounds) is sitting on the movable cushion construction 32 in the child position, the cushioned child's seat back 44 engages the back of the head of the small child. In this instance, the position of the headrest 43 is of little consequence, since, even in its lowermost position, it is disposed out of the range of possible engagement with the back of the head of the small child.

Because the headrests 43 are adapted to accommodate both the back of the head of an adult and a large child, they are disposed at a position, fore and aft, which is a compromise between the ideal position for accommodating the head of an adult sitting on the adult seat cushion when the associated movable cushion construction is in the adult position, and the ideal position for accommodating the head of a large child sitting on the associated movable cushion construction when the associated movable cushion construction is in the child position.

The movable cushion construction 32 preferably includes a main bolster portion 46 and a detachable peripheral second bolster portion 48, as shown. With the movable cushion construction 32 in the adult position, the forwardly facing surfaces of the main and second bolster portions 46 and 48 provide the cushioning 30, and the bolster portions 46 and 48 fill the entire space 34 between the side cushions 26 and 28 and extend substantially along the entire extent of the adult seat back 24. It is preferred that the seat portion 42 of the cushioned pad 40 cover only the main bolster portion 46 of the movable cushion construction 32 to enable the peripheral bolster portion 48 to be detached without any excess of the padded seat portion 42 extending onto the adult seat cushion 18. Preferably, the connection between the two bolster portions 46 and 48 is in the form of a zipper arrangement. A more detailed disclosure of the detachable connection between main bolster portion 46 and peripheral second bolster portion 48 of the movable cushion construction 32 is disclosed in U.S. patent application Ser. No. 08/287,728 filed Aug. 8, 1994, as a continuation of Ser. No. 07/882,610 filed May 13, 1992, to Czapski, and hereby incorporated by reference. A fuller appreciation for another possible construction contemplated for main bolster portion 46 can also be gathered from the aforementioned patent application.

The seat assembly 10 also includes an adult seat belt assembly, the buckle portion of which is generally indicated at 50. The adult seat belt assembly can be of any type, and is provided to restrain an adult sitting on the seat assembly in the adult position. The child's seat belt assembly of the present invention, generally indicated at 60, is connected with the seat frame assembly (e.g., with seat back frame assembly 20). The child's seat belt assembly 60 includes a pair of shoulder belts 62, each extending from respective take-up reels 64 (see FIG. 2) connected with the upper portion of seat back frame assembly 20. The shoulder belts 62 extend forwardly of the cushioned child's seat back 44 for extension over the shoulders of a child sitting on the cushioned child's seat 42 with the movable cushion construction 32 in the child position. A connector structure 70 is provided to latch the shoulder belts 62 in restraining relation with respect to a child's seat occupant. The connector structure 70 includes a main shield portion 74, preferably made from a rigid moldable plastic material, that slidingly receives the shoulder belts 62 through slots 72 provided therein. The connector structure also includes a latch or buckle mechanism 76 provided at a lower portion thereof for releasable connection with a connecting member in the form of a metal connecting tongue or clip 78 provided with the main bolster portion 46 of the cushioned child's seat. The connecting clip 78 provides an anchor point which enables the child's seat belt assembly 60 to be releasably locked between the legs of a child sitting on the cushioned child's seat. The latch mechanism 76 can be released from the connecting clip 78 by depressing an unlocking button 77 provided on the latch mechanism 76.

Figure 2:
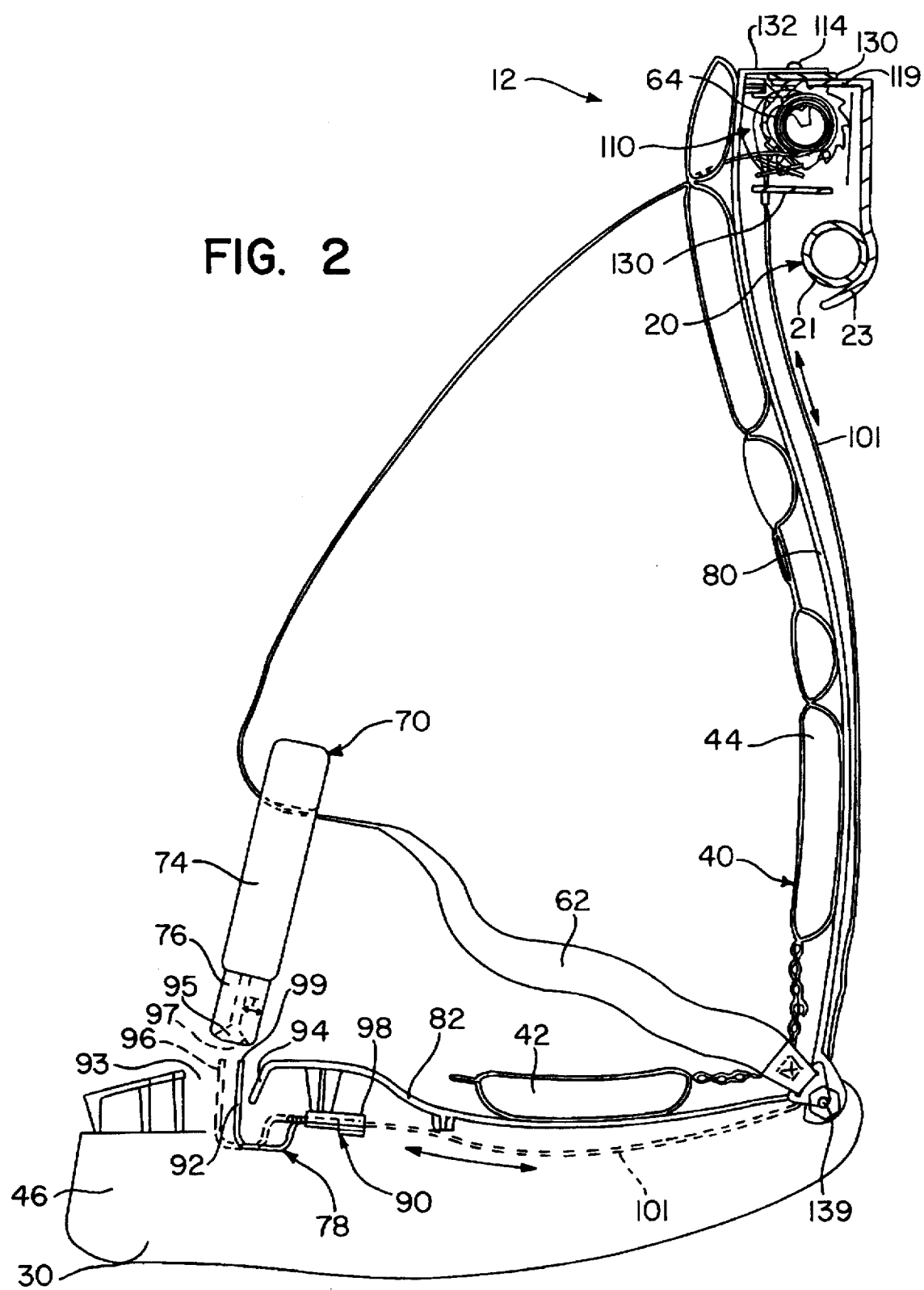
FIG. 2 is a schematic side view, with certain elements omitted to better reveal others, showing an integrated child's seat module mounted on a vehicle seat back frame in accordance with the principles of the present invention.

FIG. 2 is a side view schematically showing the child seat module 12 of the present invention. As shown, the peripheral bolster portion 48 of the movable cushion construction 32 has been removed. It can also be appreciated that the child seat module 12, which is to be mounted on the seat back frame assembly 20 between the side cushions 26 and 28, includes a rigid structure, which in the broader aspects of the present invention, may be regarded as part of the seat back frame. The rigid structure is in the form of a back panel 80 of rigid material, as, for example, a suitable moldable plastic material. This same moldable material can be used for a horizontal support member 82, which is disposed in overlying horizontal relation on the cushioning 30 when the movable cushion construction 32 is in the child position. Preferably, the removable cushioned pad 40 is adhered to the back panel 80 and support member 82 by use of VELCRO fastener material in the manner described in the aforesaid '728 and '610 applications.

The metal connecting clip 78 is spring biased by a spring assembly 90 into a rearward inoperative position, as indicated by the solid line position of clip 78 in FIG. 2. The connecting clip 78 has a vertically extending portion 92 extending upwardly through an opening 93 in the rigid support 82, adjacent a downwardly sloping edge 94 of the support 82.

To lock the child's seat belt assembly 60, an individual grasps the shield portion 74 or latch mechanism 76 of connector structure 70 and latches the latch mechanism 76 onto clip 78 by forcing the latch mechanism 76 onto the vertical portion 92 of the clip 78. Latch mechanism 76 is provided with a slot 95 for receiving clip 78 in conventional fashion. It can be appreciated that when clip 78 is in its biased inoperative rearward position, the distance between the vertical portion 92 of clip 78 and the sloping edge 94 of the rigid support surface 82 is less than the thickness "T" between the aforementioned receiving slot 95 and the outer housing of latching mechanism 76 as can be appreciated from FIG. 2. Thus, movement of the latching mechanism 76 into latching engagement with clip 78 causes a leading sloping surface 97 of latching mechanism 76 to contact the upper edge 99 of clip 78. Continued downward forced movement of the mechanism 76 onto the clip 78 causes the thickness "T" thereof to be wedged between the vertical portion 92 of clip 78 and sloping edge 94 until the clip 78 moves forwardly into the dashed-line operative position, generally indicated at 96, against the bias of spring assembly 90.

The rearward portion of clip 78 is connected with one end of a cable member 100. The cable member 100 extends rearwardly from the clip 78 through a flexible sheath or tube 101, one end of which is fixed beneath rigid support 82. The cable member 100 and surrounding flexible tube 101, which constitute a Bowdine wire assembly extend upwardly behind the back panel 80 for connection with a controlling mechanism, generally indicated at 110 in a manner hereinafter to be more fully described. When the latch mechanism 76 is latched onto clip 78 so that clip 78 is moved to the operative position, the cable member 100 causes controlling mechanism 110 to lock reels 64 against paying-out belts 62. In this fashion, when a child occupies the child's seat in the child position, and the locking mechanism 76 is latched onto clip 78, the belts 62 will not permit the child to move forwardly to any significant extent.

FIGS. 3 and 4 are schematic views showing certain portions of the child seat module 12 of the present invention. More specifically, the back panel 80 is shown, together with reels 64 and controlling mechanism 110 carried by a metallic mounting frame assembly 130. In FIG. 4 it can be appreciated that the controlling mechanism 110 is protected by a forward shield housing 113, which may be formed as part of the frame assembly 130. The back panel 80 is secured to mounting frame assembly 130 via fasteners 114. More specifically, mounting frame 130 is positioned so that an upper frame portion 131 thereof is disposed beneath a rearwardly extending flange portion 132 of the back panel 80, and appropriate fasteners 114 are extended through openings 115 through the flange portion 132 and then through aligned openings 118 in the upper frame portion 131 to make the securement. Referring back to FIG. 2, it can be appreciated that fasteners 114 are also used to secure back panel 80 and mounting frame assembly 130 to the seat back frame 20. More specifically, upper rail portion 23 has a forwardly extending flange portion 119 having openings therethrough (not shown) that are aligned with openings 115 and 118 and which receive lower portions of the fasteners 114 therethrough. Preferably, the upper frame portion 131 of mounting assembly 130 is slid up on top of the forwardly extending flange portion 119 so that the seat back frame assembly 20 supports both the mounting assembly 130 and back panel 80 without reliance solely on the fasteners 114. It can be appreciated, however, that the upper frame portion 131 and flange 132 can be mounted and secured beneath the flange portion 119 if desired. In any event, the take-up reels 64 are rigidly connected with an upper portion of the back panel 80 and the seat back frame assembly 20.

Referring back to FIGS. 3 and 4, it can be appreciated that reels 64 may be considered to include a common spindle or spool assembly 120. In the broader aspects of the invention, however, the reels 64 can be considered to be formed only by the belt material itself which is wound or coiled on the spool assembly 120. The ends of the belt material within reels 64 are fixed to the spool 120 in any conventional manner. The spool assembly 120 extends through side openings 104 in frame assembly 130 so as to be rotatably carried by the mounting frame 130 and operatively connected with the controlling mechanism 110. Spool 120 is rotatable in opposite directions about its own axis to effectuate pay-out and take-up of belts 62 to and from reels 64. The controlling mechanism 110 is constructed to selectively permit and prevent rotation of spool 120 to control pay-out and take-up of the belts 62 by the reels 64. Unlike a conventional belt retraction assembly in which one controlling mechanism is used for each reel, and in which each reel is rotatable about its own spool, the present invention enables a single controlling mechanism to be used to control two reels, as the two reels share the same spool. As a result, each belt is taken-up and paid-out simultaneously with and to the same extent as the other so that substantially the same length of each belt will extend from the respective reels at all times. This prevents uneven distribution of the belts, and reduces the cost and size of the components required in the assembly. The reduced size enables the reels and controlling mechanism to be easily mounted on the upper portion of the seat back frame.

In FIGS. 3 and 4 it can be seen that each reel 64 consists of belt material wound upon itself about spool assembly 120. While the reels may be encased in housings having slots through which the belts 62 may extend, it is preferred that such housings be omitted. It has been found that contact between the belts and the edges defining the aforementioned slots may impose unwanted friction on the belts and interfere with pay-out and take-up of the belts.

The upper portion and rearwardly extending flange portion 132 of back panel 80 are provided with spaced openings 134, which permit the belts 62 to extend forwardly of the back panel 80 therethrough. The edges defining the spaced openings 134 guide the belts 62 as they are unwound from, and wound on spool assembly 120. The bottom portion of the back panel 80 is provided with holes 136 for securement to the lower portions of the seat back frame 20. In addition, spaced openings 138 are formed at opposite lower sides of back panel 80 for receiving appropriate fasteners 139. The fasteners 139 are used to mount the back panel on the opposite rearward sides of the movable cushion construction 32 and to connect the lower ends of the belt 62 with said opposite rearward sides as shown in FIG. 2. It can be appreciated that fasteners 139 serve as an anchor for the lower ends of belts 62 and also as a pivot point for the movable cushion construction 32.

Figure 5:
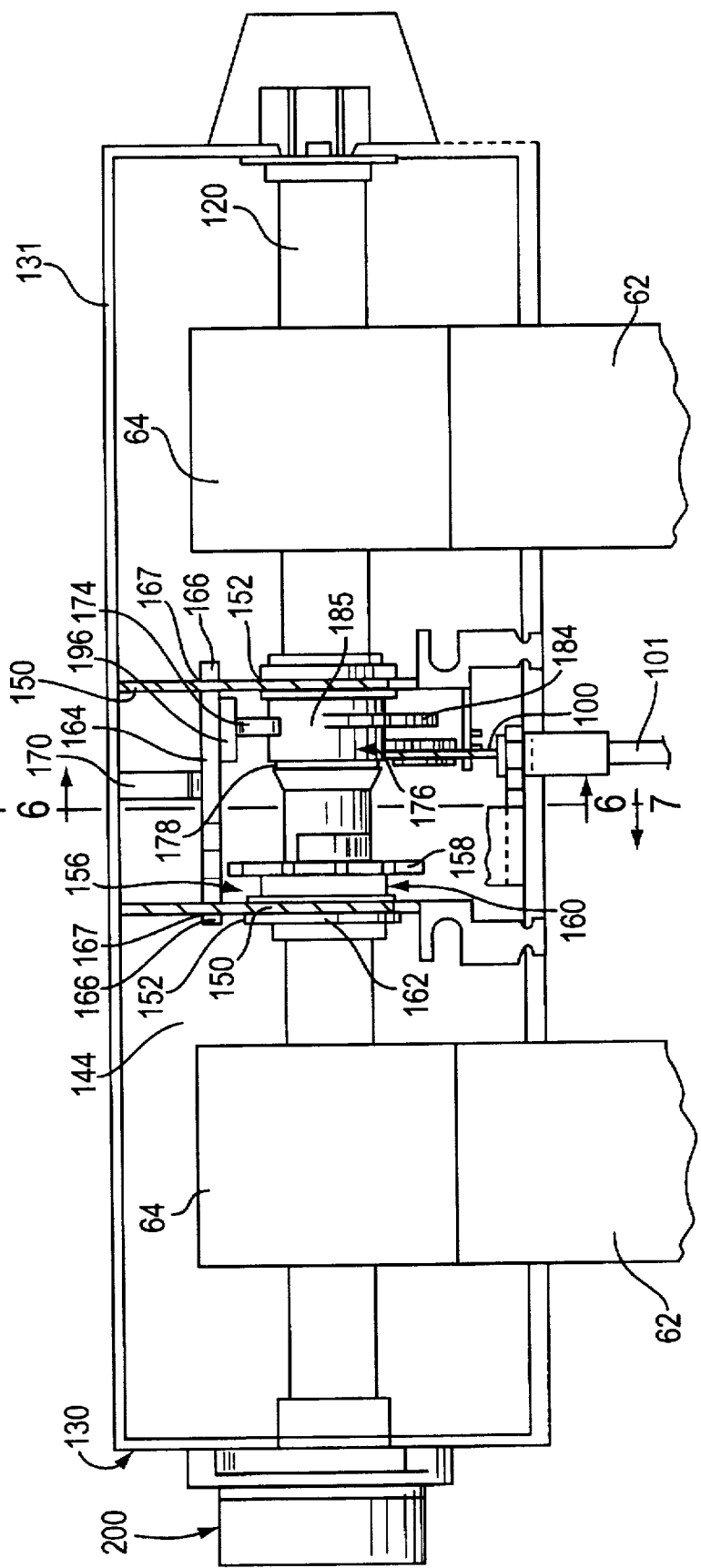
FIG. 5 is a front plan view, with certain parts removed to better reveal others, of the take-up reels and controlling mechanism in accordance with the principles of the present invention.

FIG. 5 is a plan view, partly in section, of a portion of the child's seat belt assembly of the present invention. In FIG. 5, certain elements (such as the front plate of shield housing 113) are omitted to better reveal others. The shield housing 113 has opposite side walls 150 having openings 152 therethrough for receiving spool assembly 120. Disposed about the spool assembly 120 within the shield housing 113 is a ratchet assembly 156, which includes a metallic ratchet member 158 rigidly mounted on a plastic bearing member 160. The bearing member 160 rotates with spool assembly 120 and has a peripheral annular groove provided in a portion 162 thereof. The peripheral groove provided within portion 162 is adapted to receive the inner edges defining one of the openings 152 in the side walls 150 of the shield housing 113. Preferably, bearing 160 is formed from a plastic material.

As also shown in FIG. 5, the controlling mechanism further includes a pawl member 164, which is in the form of a metallic plate having opposite pin portions 166 extending from opposite sides thereof through respective openings 167 in the opposite parallel sides 150 of the shield housing 113. The pin portions 166 extend through the respective openings in such fashion as to permit the pawl member 164 to pivot about an axis generally defined by the pin portions 166. The controlling mechanism further includes a leaf spring 170 for biasing the pawl member 164 in a pivotal direction towards the ratchet member 158. In FIG. 5, however, the pawl is kept out of engagement with ratchet member 158 via the engagement of pawl member 164 with a lever arm 174 mounted on a rotatable plastic wheel 176. The metal pawl member 164 has a plastic engagement member 196 fixed thereto and provided to contact the arm 174. The wheel 176 is rotatably mounted on a bearing 178, which is fixed to the spool assembly 120. This arrangement enables the wheel 176 to be rotatable independently of the spool 120. This is unlike the arrangement of ratchet member 158 and bearing 160, wherein ratchet 158 is fixedly mounted with respect to bearing 160, and bearing 160 is fixedly mounted with respect to spool assembly 120 so that rotation of ratchet 158 can occur only with rotation of the spool assembly 120. Spool assembly 120 is normally biased in a rotational direction that will cause reels to take-up slack in belts 62 from a generally bottom portion of reels 64. Such biasing of the spool assembly is accomplished with a conventional spring assembly, generally indicated at 200, which is connected at one side of the mounting frame assembly 130.

Figure 6:
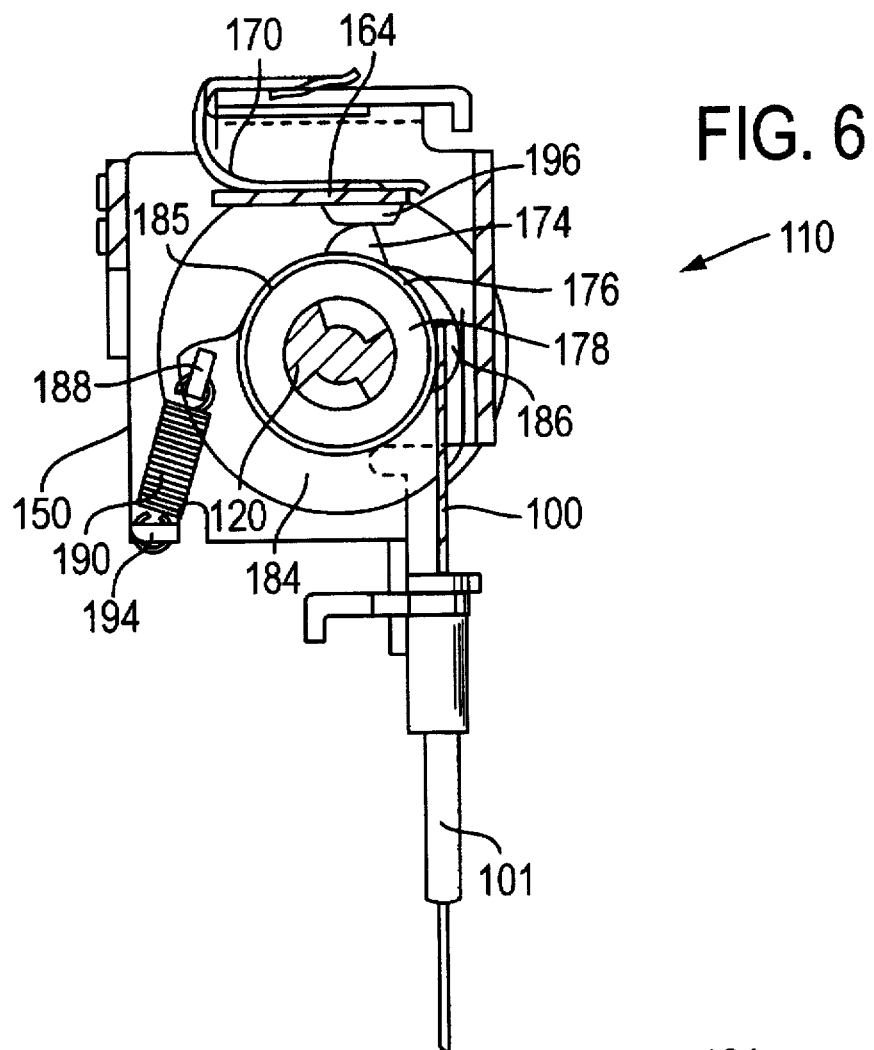
FIG. 6 is a side sectional view taken along the line 6—6 in FIG. 5, showing the controlling mechanism in an unlocked condition in accordance with the principles of the present invention.
Figure 7:
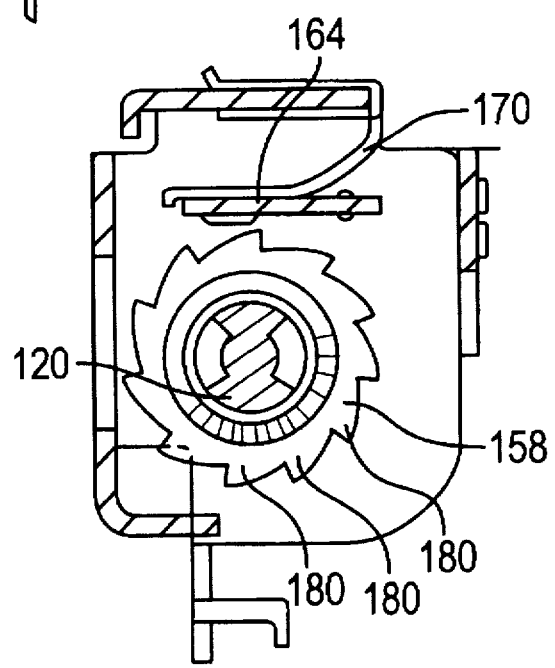
FIG. 7 a side-sectional view taken along the line 7—7 in FIG. 5, showing the controlling mechanism in an unlocked condition in accordance with the principles of the present invention.

FIG. 6 is a view taken through the line 6—6 in FIG. 5, and shows the pawl member 164 retained in its unlocked position relative to ratchet member 158 against the biasing force of leaf spring 170 by the stopping action of lever arm 174. This can be more fully appreciated from FIG. 7, which is a sectional view taken through the line 7—7 in FIG. 5. FIG. 7 shows the pawl member 164 out of engagement with teeth 180 provided along the outer periphery of ratchet member 158.

Referring back to FIGS. 5 and 6, it can be appreciated that lever arm 174 extends radially outwardly from an annular core portion 185 of wheel 176. It can also be seen that wheel 176 further has a plate-like radially extending flange portion 184 that partially surrounds the core portion 185, and a spring receiving portion 188 formed on the flange portion 184. The wheel also has a hook portion 186 radially extending from the core portion 185. Preferably, the wheel 176 is integrally formed from a molded plastic material.

Figure 8:
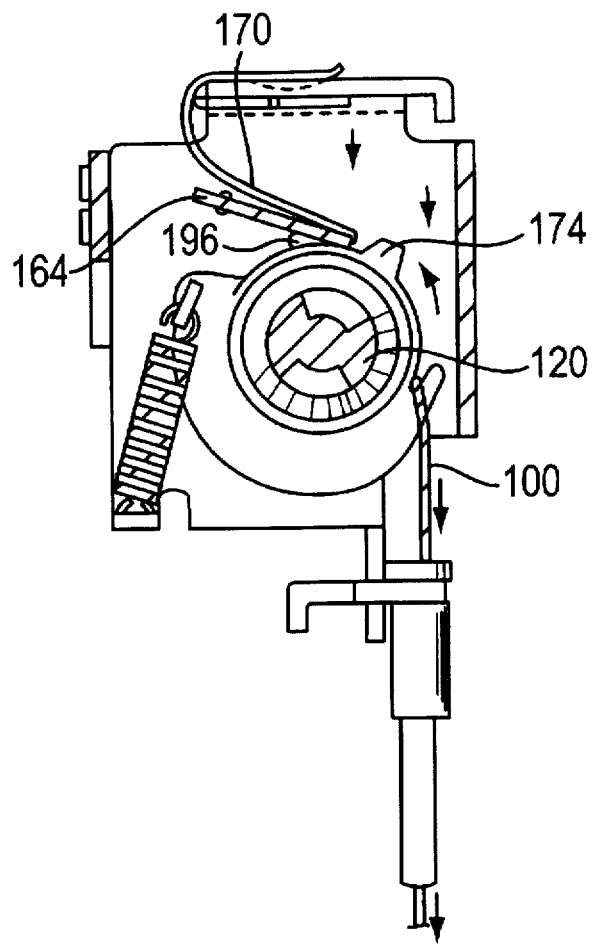
FIG. 8 is a side-sectional view similar to FIG. 6, but showing the controlling mechanism in a locked condition in accordance with the principles of the present invention.
Figure 9:
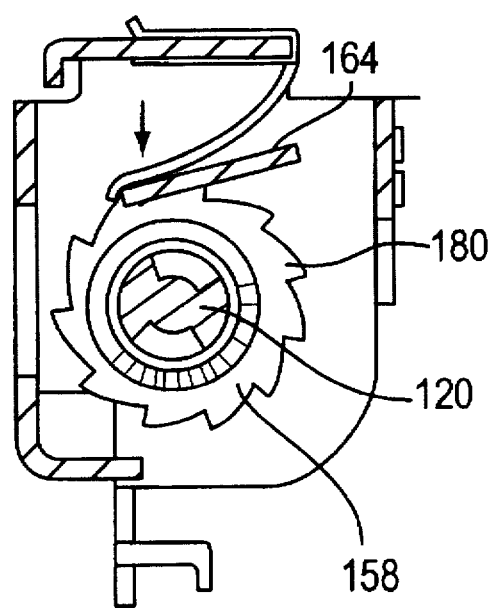
FIG. 9 is a side-sectional view similar to FIG. 7, but showing the controlling mechanism in a locked condition in accordance with the principles of the present invention.

FIG. 6 shows the lever arm 174 in its furthest counter-clockwise position, as limited by action of the cable 100 and the rearwardmost position that can be assumed by connector 78 in its inoperative position. FIG. 6 also shows the connection of the Bowdine wire assembly to the controlling mechanism 110. As shown, the adjacent end of the flexible tube 101 is fixed to the frame assembly 130. The adjacent end of the cable member 100 is looped around and fixed to the hook portion 186. When connector 78 is moved to its operative position 96, cable 100 will be tensioned to cause clockwise movement of wheel 176 in FIG. 6 against the force of a coil spring 190 connected between the spring receiving portion 188 and a connecting portion 194 of shield housing 113. This can be clearly seen in FIG. 8. As can also be appreciated from FIG. 8, movement of the wheel in such fashion causes lever arm 174 to come out of engagement with the plastic engagement member 196 of pawl member 164 to permit pivotal movement of pawl member 164 about pin members 166. The biasing force of leaf spring 170 forces such pivotal movement of pawl 164 until it engages one of the ratchet teeth 180, as shown in FIG. 9. Once pawl member 164 engages one of the teeth 180, spool 120 cannot be rotated in the clockwise direction in FIG. 9, and the reels 64 are thus prevented from paying-out belts 62.

In FIG. 9, the bias of spool 120 via spring assembly 200 (e.g., see, FIG. 5) may move the ratchet member 158 in a counter clockwise direction when an excess amount of slack remains in the belts 62, even after the child's seat belt assembly is locked between the legs of a child seat occupant. The pawl member 164 will then engage the next tooth within teeth 180 to retain the belts 162 slightly tensioned over the shoulders of the child seat occupant at all times. It can be appreciated that the degree of tensioning can be controlled to some extent by the spacing between teeth 180 and by the degree of biasing force provided by spring assembly 200.

Figure 10:
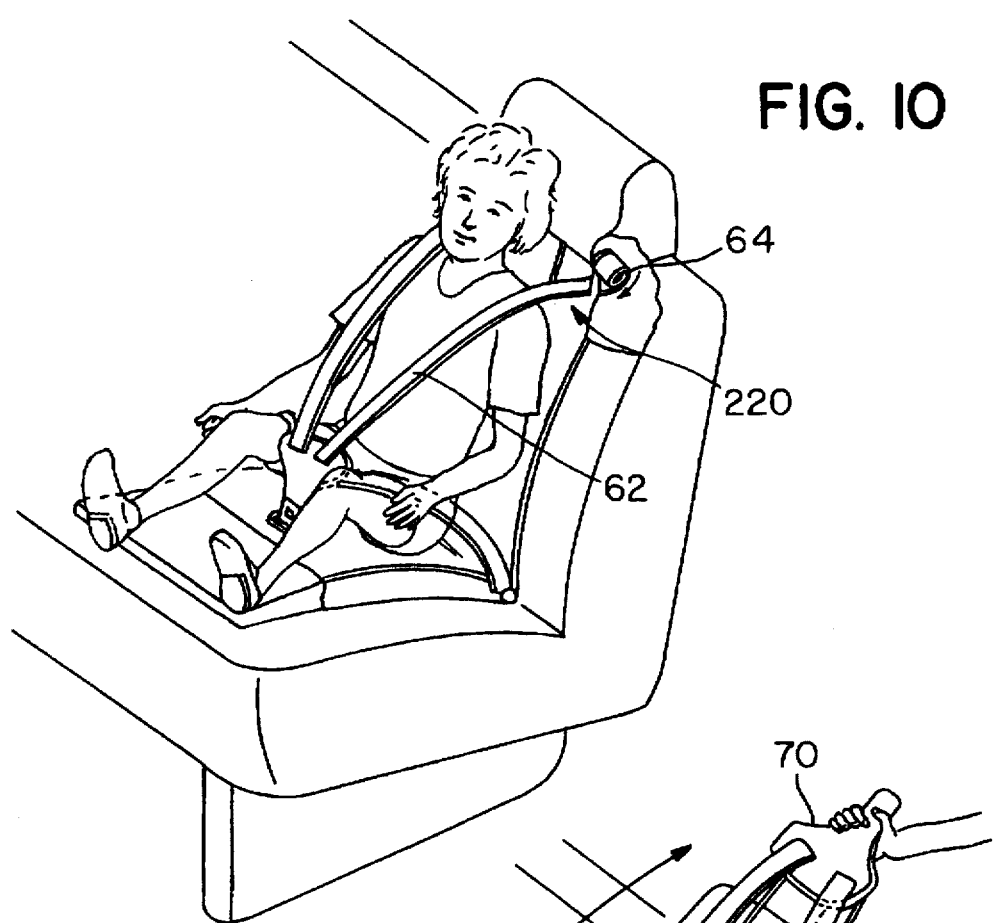
FIG. 10 is a perspective view showing the seat assembly in the child position with the child's seat belt assembly in restraining relation with respect to a child's seat occupant.
Figure 11:
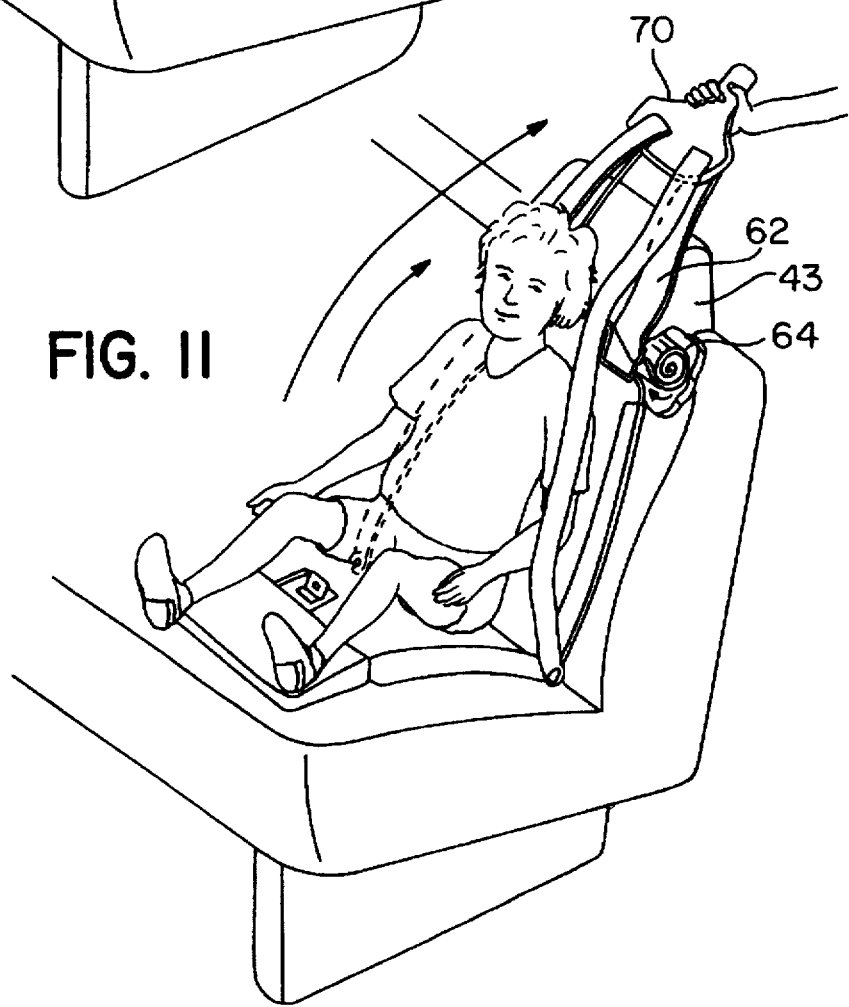
FIG. 11 is a perspective view similar to FIG. 10, but showing the child's seat belt assembly being moved out of restraining relation with respect to a child's seat occupant.

FIG. 10 is a perspective view showing the child seat belt assembly in an operative position, extending over the shoulders of a child seat occupant and locked at the anchor point between the legs of the occupant. Because shoulder belt 62 are wound or Coiled in a clockwise direction, in FIG. 10, around spool assembly 120, the shoulder belts 62 pay-out generally from the bottom portion of reels 64. In FIG. 11, the child seat belt assembly is shown in its inoperative position by being manually released from between the legs of the child by a single hand of an individual. This can easily be accomplished by the individual using the thumb to depress the unlocking button 77 on latch mechanism 76 and lifting the belts off the shoulders of the child with the same hand by moving the connector structure 70 over the head of the child. It can be appreciated from FIG. 11 that the belts 62 pay-out from portions of the reels 64 generally higher than the aforesaid bottom portions (e.g., compare the arrows in FIGS. 10 and 11) when an individual lifts the belts off the shoulders of the child by lifting the connector structure over the head of the child.

In FIG. 11, the individual lifting the connector structure 70 can simply release the connector structure so that the belts 62 rest upon headrest 43 and so that the connector structure rests or hangs behind headrest 43. The biasing force provide by the spring assembly 200 and the weight of the connector structure 70 are judiciously chosen such that the weight of the connector structure 70 behind headrest 43, together with the resistance provided by the belts 62 lapping over the headrest, will provide sufficient resistance to the biasing force of spring assembly 200 to prevent the spring assembly 200 from taking-up belts 62. This leaves both hands of the individual free to remove the child seat occupant from the child's seat.

Because the belts 62 are wound on reels 64 such that they pay-out from bottom portions of the reels, less friction is imposed on the belts 62 as they are lifted into the position shown in FIG. 11. More specifically, if the belts 62 were to pay-out from upper portions of the reels 64 (e.g. by being wound in a counter-clockwise direction on spool assembly 120, as opposed to the clockwise direction shown in FIGS. 10 and 11), there would be more interference from other portions of the seat assembly 10 (e.g., upper portions within adult seat back 24) as shoulder belts 62 pay-out from reels 64.

Also, because belts 62 pay-out from bottom portions of the reels as aforesaid, the belts naturally tend to pay-out from relatively higher positions with respect to the reels as belt material is depleted from the reels 64. Because relatively less belt material is required in harnessing a small child in comparison with a large child sitting on the movable cushion construction 32, the reels 64 retain more belt material when a small child is harnessed by the belt assembly 60. With more material retained on the reels 64, the belts 62 will extend from a relatively low position from reels 64. In contrast, when a large child occupies the child's seat, more belt material is required and reels 64 are somewhat more depleted so that they pay-out from a relatively higher position. This arrangement provides a slight adjustment of the position at which the belts 62 are paid-out in order to comfortably accommodate children of different sizes.

It thus will be seen that the objects of this invention have been fully and effectively accomplished. It will be understood, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A seat assembly including an integrated child seat assembly for a motor vehicle comprising:

a seat frame assembly for securement within the motor vehicle including a seat cushion frame and a seat back frame mounted with respect to said seat cushion frame in an operative fixed relation;

a cushion assembly mounted on said seat frame assembly and including a movable cushion construction mounted for movement between (1) an adult position wherein said cushion assembly including said movable cushion construction provides an adult seat cushion disposed in an operative position with respect to said seat frame assembly and a cushioned adult seat back for engaging the back of an adult sitting on said adult seat cushion, and (2) a child position wherein said cushion assembly including said movable cushion construction provides a child's seat disposed in a position above the operative position of said adult seat cushion for engaging a child sitting thereon, and a cushioned child's seat back extending upwardly from said cushioned child's seat for engaging the back of a child sitting on said cushioned child's seat;

an adult seat belt assembly mounted with respect to said seat assembly constructed and arranged to be disposed in restraining relation with respect to an adult sitting on said adult seat cushion with said movable construction in said adult position;

a child's seat belt assembly connected with said seat frame assembly constructed and arranged to be locked in restraining relation with respect to a child sitting on said cushioned child's seat with said movable construction in said child position;

said cushioned child's seat providing an anchor point for the child's seat belt assembly between the legs of a child sitting on said cushioned child's seat, said child's seat belt assembly including a pair of belts each associated with respective take-up reels, said take-up reels being mounted on a single rotatable spool assembly, said single spool assembly mounted for rotation at an upper portion of said seat back frame and rearwardly of said cushioned child's seat back, said belts extending from said respective take-up reels forwardly of said cushioned child's seat back for extension over the shoulders of a child sitting on the cushioned child's seat with said movable cushion assembly in said child position, said belts each having upper portions thereof being wound on said respective take-up reels in such a fashion that the belts pay-out generally from bottom portions of the reels when said belts are extended forwardly of said cushioned child's seat back, said child's seat belt assembly being devoid of any rigid obstruction forwardly of said reels such that said belts extend forwardly of said cushioned child's seat back from relatively higher positions as said belts are paid out from said reels as a result of said belts being depleted from said reels, said belts being wound on said spool assembly such that rotation of said spool assembly in one direction causes coiling of said belts on said take-up reels to effectuate take-up of said belts, and rotation of said spool assembly in an opposite direction causes uncoiling of said belts from said take-up reels to effectuate pay-out of said belts, said spool assembly being biased for rotation in said one direction to take-up said belts, said spool assembly being manually movable in said opposite direction against said bias to effect pay-out of said belts from said reels when said child's seat belt assembly is unlocked from said restraining relation with respect to said child sitting on said cushioned child's seat, and a single controlling mechanism operatively connected with said single spool assembly and disposed rearwardly of said cushioned child's seat back, said single controlling mechanism constructed and arranged to control the pay-out and take-up of said belts by said respective reels in such a fashion that each belt is taken-up and paid-out simultaneously with and to the same extent as the other such that substantially the same length of each of said belts will extend from said respective reels at all times, said single controlling mechanism being constructed and arranged to lock said spool assembly against movement in said opposite direction so as to prevent pay-out of said belts when said child's seat belt assembly is locked in said restraining relation with respect to said child sitting on said cushioned child's seat.

2. A seat assembly according to claim 1, wherein said cushion assembly includes a pair of side cushions fixedly carried by said rigid seat back frame so as to define a space therebetween, said movable cushion construction when in said adult position effectively filling said space.

3. A child's seat module for mounting on a seat back frame of a vehicle seat having a seat cushion and spaced apart side cushions on the seat back frame defining a child-receiving space therebetween, said child seat module comprising a rigid back panel of a size to fit within the space between the side cushions constructed and arranged to engage the seat back frame forwardly thereof within a rearward portion of the space between the side cushions for fixed securement thereto;

a movable cushion construction movably connected with said back panel for movement between (1) an adult position wherein the movable cushion construction is disposed within the space between the side cushions and provides a cushioned adult seat back for engaging the back of an adult sitting on said seat cushion, and (2) a child position wherein said movable cushion construction extends from the space between the side cushions and provides a cushioned child's seat extending from the bottom of the space in overlying relation to the seat cushion and a cushioned child's seat back extending upwardly from said cushioned child's seat within the space between the side cushions, a child's seat belt assembly connected with said back panel constructed and arranged to be locked in restraining relation with respect to a child sitting on said cushioned child's seat with said movable cushion construction in said child position;

said movable cushion construction when in said child position providing an anchor point for the child's seat belt assembly between the legs of a child sitting on said cushioned child's seat:

said child's seat belt assembly including a pair of belts each associated with respective take-up reels, said take-up reels being mounted on a single rotatable spool assembly, said single rotatable spool assembly mounted for rotation at an upper portion of said back panel and disposed rearwardly of said cushioned child's seat back, said belts extending from said respective take-up reels forwardly of said cushioned child's seat back for extension over the shoulders of a child sitting on the cushioned child's seat with said movable cushion assembly in said child position, said belts each having upper portions thereof being wound on said respective take-up reels in such a fashion that the belts pay-out generally from bottom portions of the reels when said belts are extended forwardly of said cushioned child's seat back, said child's seat belt assembly being devoid of any rigid obstruction forwardly of said reels such that said belts extend forwardly of said cushioned child's seat back from relatively higher positions as said belts are paid out from said reels as a result of said belts being depleted from said reels, said belts being wound on said spool assembly such that rotation of said spool assembly in one direction causes coiling of said belts on said take-up reels to effectuate take-up of said belts, and rotation of said spool assembly in an opposite direction causes uncoiling of said belts from said take-up reels to effectuate pay-out of said belts, said spool assembly being biased for rotation in said one direction to take-up said belts, said spool assembly being manually movable in said opposite direction against said bias to effect pay-out of said belts from said reels when said child's seat belt assembly is unlocked from said restraining relation with respect to said child sitting on said cushioned child's seat, and a single controlling mechanism operatively connected with said single spool assembly and disposed rearwardly of said cushioned child's seat back, said single controlling mechanism constructed and arranged to control the pay-out and take-up of said belts by said respective reels in such a fashion that each belt is taken-up and paid-out simultaneously with and to the same extent as the other such that substantially the same length of each of said belts will extend from said respective reels at all times, said single controlling mechanism being constructed and arranged to lock said spool assembly against movement in said opposite direction so as to prevent pay-out of said belts when said child's seat belt assembly is locked in said restraining relation with respect to said child sitting on said cushioned child's seat.

* * * * *